K. KAISER.
PROCESS OF OBTAINING METALS FROM THEIR ORES.
APPLICATION FILED JUNE 22, 1906.
904,263.  Patented Nov. 17, 1908.
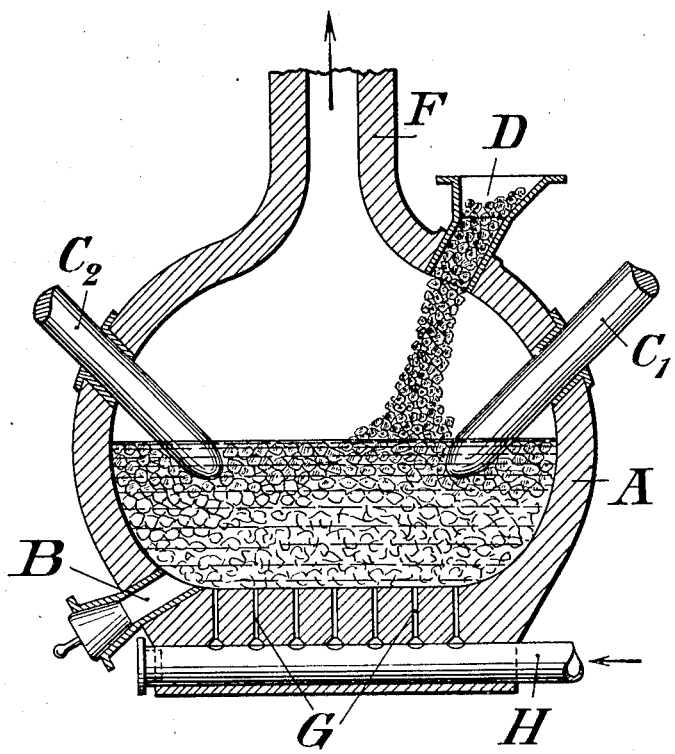

UNITED STATES PATENT OFFICE.

KARL KAISER, OF BERLIN, GERMANY.

PROCESS OF OBTAINING METALS FROM THEIR ORES.

No. 904,263.     Specification of Letters Patent.     Patented Nov. 17, 1908.

Application filed June 22, 1906. Serial No. 322,971.

*To all whom it may concern:*

Be it known that I, KARL KAISER, professor of physiology, a subject of the German Emperor, residing at Berlin, 10 Meierottostrasse, Germany, have invented certain new and useful Improvements in Processes of Obtaining Metals from Their Ores; and I do hereby declare the following to be a full, clear, and exact description of the invention, such as will enable others skilled in the art to which it appertains to make and use the same.

My invention relates to an improvement in processes of obtaining metals from their ores.

The object of the invention is to provide a simple and efficient method whereby the metals may be obtained in a particularly pure condition, and whereby a very ready separation of different metals contained in one and the same raw material is attained.

With these general objects in view, my invention broadly considered consists in subjecting the ores to heat in an electric furnace, passing an oxidizing gas into contact with said heated ore and then passing a reducing gas into contact with the heated material.

My invention will now be described more particularly in connection with the accompanying drawings and then particularly pointed out in the claims.

The drawing is a diagrammatic section of a furnace especially suitable for carrying out my process.

Referring to the drawings, A is a furnace chamber of pear shape with a perforated bottom. Through openings in either side are introduced electrodes C' and C². Raw material is introduced into the furnace through a charging hopper D. At B is indicated a tapping spout through which the liquid constituents may be run off.

Through the neck F of the furnace, gaseous constituents may escape and can be led to any suitable receiver. A supply pipe H is connected to the bottom of the chamber by means of nozzles G, G whereby oxidizing and also reducing gases may be supplied to the furnace.

My improved process is of particular advantage in its application to ores containing zinc, and especially the pyrite residues containing zinc, such raw material, as is well known, also containing iron and sulfur. By my process not only is the zinc reduced, but also the iron, and the two metals are obtained separate from each other in a very pure condition.

My improved process is carried out as follows: Suitable ores or products of smelting works are introduced into an electric furnace, for example, the furnace shown in the drawing, a suitable quantity of fluxes, for example, such as limestone and quartz, being added if necessary. The mass is then heated and as soon as the necessary temperature has been attained, *i. e.*, in most cases the melting temperature of the mixture, an oxidizing gas such as atmospheric air is introduced into the heated mass, this oxidizing gas serving to oxidize all combustible impurities in the ore, the gaseous products resulting therefrom being led off from the furnace. When this stage of the process is complete, I then introduce a reducing gas to the heated mass. For this purpose, gaseous carbon compounds and hydrogen can be employed. The most suitable for my process are carbon monoxid, water gas and Dowson gas. The volatile metals escaping in gaseous form, for example, the zinc, are led out of the furnace and collected in a suitable receiver where they are condensed in a known manner, and thus separated from any gases which pass out with them. The liquid constituents, for example, the iron, are led off from the lower part of the furnace and cast directly into ingots or bars.

By employing, first, a gaseous oxidizing agent, I put the material in good condition for the production of pure metals, and moreover, I can control the amount of the oxidizing agent as may be required.

By the mere roasting and reducing of materials such as contain zinc and iron with sulfur it is impossible or only possible with great difficulty to separate the different metals completely from each other, for instance the zinc from the iron, the metals being in a fixed combination as in the state of an alloy.

By first treating the materials with oxidizing agents and then reducing them according to my process in an electric furnace this fixed combination of the metals is broken up and the metals can be entirely separated from each other.

Having thus fully described my invention, what I claim is:

1. The process of obtaining metals from materials containing oxidizable substances, which consists in heating the raw materials in an electric furnace, then forcing a gaseous oxidizing agent into contact with said heated materials, then forcing a gaseous reducing agent into contact with the heated material, leading off and condensing metals escaping in gaseous form, and running off the liquid metals into molds.

2. The process of obtaining metals which consists in heating raw materials containing such metals, in an electric furnace, until such materials melt, then forcing air into contact with the molten mass, and then forcing a gaseous reducing agent into contact with the molten mass until the metals therein are reduced.

3. The process of obtaining metals which consists in heating raw materials containing such metals, in an electric furnace, until such materials melt, then forcing a gaseous oxidizing agent into contact with the molten mass until the metals are oxidized, and then forcing carbon monoxid into the molten mass until the metals are reduced.

4. The process of obtaining separately zinc and iron from pyrite residues and products of smelting works, which consists in heating the raw products in an electric furnace, until the material melts, then forcing atmospheric air through the mass, until the metals are oxidized, then forcing carbon monoxid through the mass, leading off the zinc vapors and condensing the same and running off the molten iron into molds.

In testimony whereof I have hereunto affixed my signature in the presence of two witnesses.

KARL KAISER.

Witnesses:
 WOLDEMAR HAUPT,
 HENRY HASPER.